US012724738B2

(12) United States Patent
Yang et al.

(10) Patent No.: US 12,724,738 B2
(45) Date of Patent: Sep. 1, 2026

(54) SERIAL-BUS SYSTEM WITH DYNAMIC ADDRESS TABLE AND METHOD FOR CONTROLLING THE SAME

(71) Applicant: PROLIFIC TECHNOLOGY INC., Taipei City (TW)

(72) Inventors: Shun-Liang Yang, Taipei City (TW); Chiun-Shiu Chen, Taipei City (TW); Chih-Chin Yang, Taipei City (TW)

(73) Assignee: PROLIFIC TECHNOLOGY INC., Taipei City (TW)

( * ) Notice: Subject to any disclaimer, the term of this patent is extended or adjusted under 35 U.S.C. 154(b) by 0 days.

(21) Appl. No.: 18/384,395

(22) Filed: Oct. 27, 2023

(65) Prior Publication Data

US 2024/0160599 A1 May 16, 2024

(30) Foreign Application Priority Data

Nov. 16, 2022 (TW) ................................ 111143830

(51) Int. Cl.
*G06F 13/42* (2006.01)

(52) U.S. Cl.
CPC .. *G06F 13/4286* (2013.01); *G06F 2213/0016* (2013.01); *G06F 2213/0052* (2013.01)

(58) Field of Classification Search
None
See application file for complete search history.

(56) References Cited

U.S. PATENT DOCUMENTS 7,089,338 B1 * 8/2006 Wooten ............... G06F 13/4291 710/48
10,282,329 B2 * 5/2019 Sakuma .............. G06F 13/4282
10,783,101 B1 * 9/2020 Kamiya .............. G06F 13/1668
11,106,618 B2 * 8/2021 Arnould .............. G06F 13/1605
11,144,490 B2 * 10/2021 Kumar ................ G06F 13/4282
11,442,736 B2 * 9/2022 Jerolm .................. H04L 12/422
2002/0174210 A1 * 11/2002 Halcomb ................ H04M 3/30 709/223
2011/0119419 A1 * 5/2011 Chapelle ............ G06F 13/4068 710/110

(Continued)

FOREIGN PATENT DOCUMENTS

CN 102255784 A 11/2011
TW 200928748 A 7/2009

(Continued)

OTHER PUBLICATIONS

'Wired M-Bus Specification—section 2—The Basics of Serial Bus Systems' copyright 2020 by M-Bus. (Year: 2020).*

(Continued)

*Primary Examiner* — Steven G Snyder
(74) *Attorney, Agent, or Firm* — WPAT, PC

(57) ABSTRACT

A serial communication bus system with a dynamic address table and its control method allows the master device to detect the removal of slave devices from the serial communication bus using allocated addresses and a common initial address through interactive polling. Additionally, when new slave devices connect to the bus, they can be directly detected, and non-conflicting new addresses can be assigned, eliminating the need to reassign addresses for all connected slave devices, as required in the conventional approach.

14 Claims, 4 Drawing Sheets

(56) References Cited

U.S. PATENT DOCUMENTS

| | | | | |
|---|---|---|---|---|
| 2014/0149616 | A1* | 5/2014 | Chiang | G06F 13/4291<br>710/110 |
| 2017/0091130 | A1* | 3/2017 | Matsunaga | G06F 13/364 |
| 2017/0185548 | A1* | 6/2017 | Sakuma | G06F 13/4282 |
| 2020/0092134 | A1* | 3/2020 | Jerolm | H04L 12/42 |
| 2020/0409902 | A1* | 12/2020 | Arnould | G06F 13/4291 |
| 2021/0216490 | A1* | 7/2021 | Kumar | G06F 13/4282 |

FOREIGN PATENT DOCUMENTS

| | | | |
|---|---|---|---|
| TW | 201348974 | A | 12/2013 |
| TW | 201430576 | A | 8/2014 |
| TW | 202014901 | A | 4/2020 |
| TW | 202121183 | A | 6/2021 |
| TW | I741417 | B | 10/2021 |
| TW | 202240410 | A | 10/2022 |

OTHER PUBLICATIONS

'Simple and Robust Multipoint Data Acquisition Bus Built on Top of the Standard RS-232 Interface' by Alexey Pavluchenko et al., May 2016. (Year: 2016).*

* cited by examiner

SERIAL-BUS SYSTEM WITH DYNAMIC ADDRESS TABLE AND METHOD FOR CONTROLLING THE SAME

CROSS REFERENCE TO RELATED APPLICATION

The present patent application claims the priority benefit of Taiwan Invention Patent Application, serial number 111143830, filed on Nov. 16, 2022. The parent application should be incorporated by reference herein.

BACKGROUND

Field of Invention

The present invention pertains to a serial communication bus, particularly to a serial communication bus system with a dynamic address table and its control method.

Description of Related Art

The Inter-Integrated Circuit Bus (abbreviated as I2C) belongs to the category of serial communication buses. It employs a multiple master/slave architecture and was developed by Koninklijke Philips N. V. (Royal Philips) in the 1980s for connecting peripheral devices to motherboards, embedded systems, or mobile phones. I2C can be applied in various master-slave control architectures such as System Management Bus (SMBus), Power Management Bus (PMBus), Intelligent Platform Management Interface (IPMI), Display Data Channel (DDC), Advanced Telecom Computing Architecture (ATCA), and some others.

The I2C bus uses only two bidirectional open-drain lines. One line is the serial data line (SDA) for transmitting data, and the other line is the serial clock line (SCL) for initiating or stopping transmissions and transmitting clock sequences. Both of these lines have pull-up resistors. I2C allows for a wide range of operating voltages, from typical voltage levels of 5V, 3.3V, or even lower operating voltage values. Additionally, I2C's reference design uses a 7-bit address format but reserves 16 addresses, allowing communication with up to 112 nodes in one serial bus. Common I2C buses have different modes based on transmission speed: Standard Mode (100 kbit/s), Low-Speed Mode (10 kbit/s), and the clock frequency can be allowed to drop to zero, which means communication can be paused. The new generation of I2C buses can communicate with more nodes (supporting a 10-bit address format) at faster rates, such as Fast Mode (400 kbit/s), Fast-Mode Plus (1 Mbit/s), High-Speed Mode (3.4 Mbit/s), and Ultra-Fast Mode (5 Mbit/s), among other transmission speeds.

However, traditional I2C bus system designs do not support plug-and-play functionality. Therefore, Taiwan Patent No. 1741417 proposes the generation of pulse signals through the serial data line (SDA) to enable the I2C bus to instantly detect the connection status. Nevertheless, the technology mentioned in Taiwan Patent No. 1741417 may lead to address conflicts between newly-connecting devices and already-connected devices, disrupting the normal transmission operation of the connected devices. Hence, when a new device is connected to the I2C bus, it becomes necessary to reassign addresses for all devices.

SUMMARY

Therefore, one objective of the present invention is to provide a serial communication bus system with a dynamic address table and its control method. Through a method of mutual polling between the master control device and the slave devices using assigned addresses and a common initial address, the system can detect the removal of slave devices from the serial communication bus. When a new slave device is connected to the bus, it can be directly detected and assigned a new address that does not conflict with the addresses of already connected slave devices, thus eliminating the drawback of the known technology that requires reassigning addresses for all slave devices.

To achieve the above objectives, this present invention provides a serial communication bus system with a dynamic address table, which comprises: a master device; multiple slave devices, where each of said slave devices can be one of a connected device and a newly connected device; and a serial communication bus, serving as a connection interface between said master device and said slave devices; wherein said master device has a dynamic address table with multiple bits, each corresponding to said slave devices, and if said slave device is said connected device, the corresponding bit has a first logic state; if said slave device is said newly connected device, before connection, the corresponding bit has a second logic state, and after connection, said master device assigns a simulated identification code to said newly connected device as a device address, and upon confirmation, updates the bit value of the corresponding bit from said second logic state to said first logic state.

Moreover, the present invention provides a method for controlling a serial communication bus system having a dynamic address table, which comprises a master device, multiple slave devices, and a serial communication bus connecting said master device and said slave devices, and said master device having said dynamic address table, said control method comprising the following steps: (a) initializing said dynamic address table, said dynamic address table having multiple bits, each corresponding to said slave devices, where each of said slave devices is one of a connected device and a newly connected device; (b) transmitting, by said master device via said serial communication bus, a device address assigned to said connected device, and upon confirmation, setting the bit value of the corresponding bit in said dynamic address table to said first logic state, otherwise setting the bit value of the corresponding bit in said dynamic address table to said second logic state, until confirming said connected device; (c) when said newly connected device connects to said serial communication bus, searching for the bit in said dynamic address table having said second logic state, said master device assigns a simulated identification code to said newly connected device as its device address, and upon confirmation, updates the bit value of the corresponding bit from said second logic state to said first logic state; and (d) Returning to step (b).

BRIEF DESCRIPTION OF THE DRAWINGS

To assist those of ordinary skill in the relevant art in making and using the subject matter hereof, reference is made to the appended drawings, in which like reference numerals refer to similar elements.

DETAILED DESCRIPTION OF PREFERRED EMBODIMENTS

By taking the standard I2C as an example, two bidirectional open-drain serial signal lines, SCL/SDA, are used. The master device communicates with I2C slave devices using fixed device addresses. When two devices with the same address are simultaneously connected, address conflict occurs. Furthermore, existing communication technologies like SMBus can only provide real-time detection of connections or removals through additional pins but cannot resolve the issue of address conflict.

The present invention provides a serial communication bus system with a dynamic address table and its control method. Through a method of mutual polling between the master device and the slave devices using assigned addresses and a common initial address, it can detect the status of whether a slave device has been removed from the serial communication bus. When a new slave device is connected to the serial communication bus, it can be directly detected and assigned a new address that does not conflict with the addresses of already connected slave devices. This achieves plug-and-play functionality without the need to reassign addresses for all slave devices.

Figure 1:
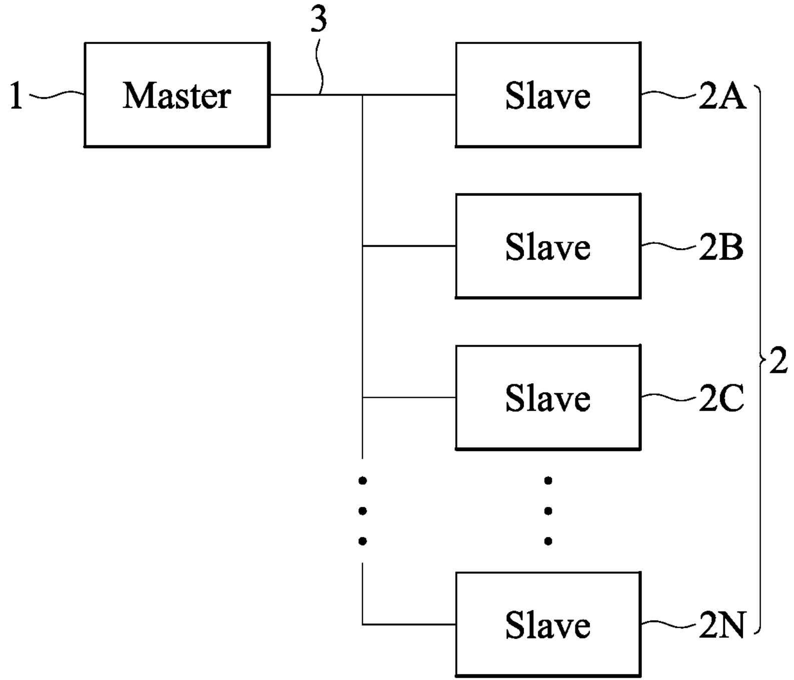
FIG. 1 shows a schematic block diagram of a preferred embodiment of the serial communication bus system according to the present invention.

Please refer to FIG. 1, which shows a schematic block diagram of a preferred embodiment of the serial communication bus system according to the present invention. As shown in FIG. 1, the serial communication bus device is exemplified using an I2C bus. The I2C bus device includes: an I2C master device 1, several I2C slave devices 2 (FIG. 1 illustrates multiple slave devices 2A, 2B, 2C, . . . , 2N, etc., and some parts of the description will use the label 2 to represent all or part of the multiple slave devices), and the connecting I2C bus 3, among others.

According to the present invention, to achieve real-time detection and instant matching of addresses, a dynamic address table is established at the end of the master device 1. It uses a 7-bit address format as the desired address for allocation, assuming the I2C bus has 7 address bits (hence, the dynamic address table corresponds to bit positions 0-127, each corresponding to one of the 128 possible addresses). An agreement is made to use any one address as a common initial address (it can be any address among the 128, such as selecting the General Call address 0b0000000 or 0x00, or specifying another address like 0b1111111 or 0x7F as the common initial address). If the common initial address is 127 (address 0b1111111 or 0x7F), the master device 1 uses the address 0x7F as a broadcast address, and subsequently assigned Simulated Identification Codes (SIDs) will avoid this common initial address.

In summary, the present invention achieves address allocation and Simulated Identification Code (SID) interaction through polling. It begins by detecting whether there are connections or removals of slave devices 2 over the I2C bus 3. When a new slave device 2 is connected to the I2C bus 3, a new SID is directly assigned from the dynamic address table as the device address for the newly connected slave device 2. This new SID is then used by the newly connected slave device 2 for communication with the I2C bus 3 and the master device 1. This approach ensures that there are no conflicts with device addresses already assigned to slave devices connected to the I2C bus 3. In other words, the dynamic address table mentioned above also serves as a real-time connection status table for slave devices 2, and it is the responsibility of the master device 1 to continuously detect the connection status of each slave device 2 and update the dynamic address table 40 accordingly.

According to the present invention, the dynamic address table 40 can be generated in three ways:

1. The I2C master device 1 can detect the connection status through hardware circuitry and then generate the dynamic address table and store it in its own memory.
2. A programmable controller can simulate the I2C master device 1 by altering the firmware. After detecting the connection status, it generates the dynamic address table.
3. Any device with I2C master device 1 functionality can generate the dynamic address table through software control by detecting signals.

Additionally, at the slave device 2 end, after initialization, the slave device 2 first accepts the common initial address command. Once it receives this common initial command, it checks if it has permission to obtain a SID. If it does, based on the bit value corresponding to the relevant bit in the dynamic address table (which is 0), the master device 1 authorizes a new SID to be assigned to the slave device 2 as its device address. Once the SID is confirmed to be available, it can be used as the device address for communication with the master device 1.

Figure 2:
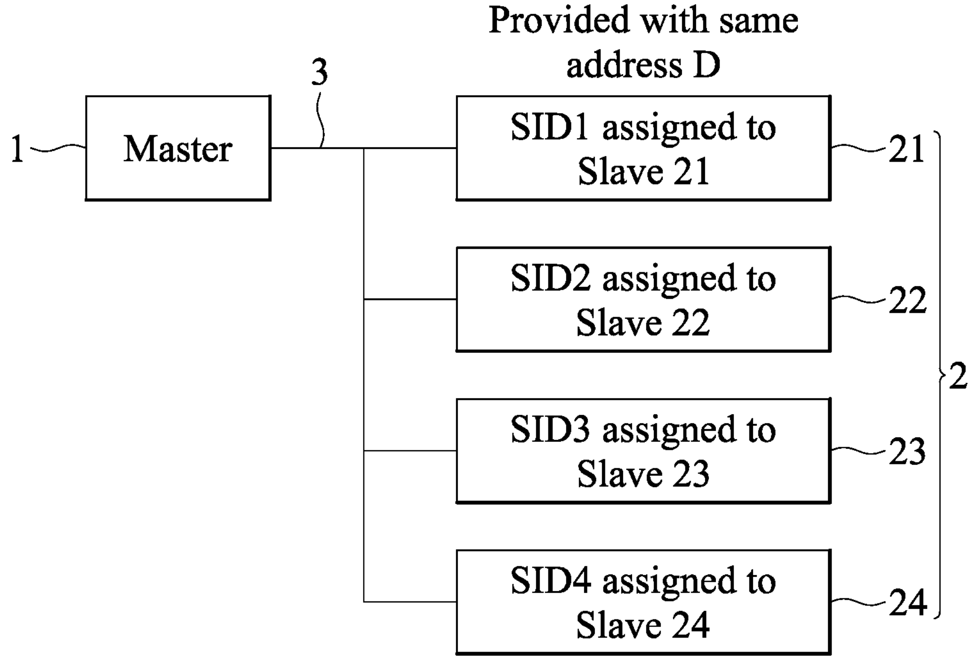
FIG. 2 illustrates a hardware architecture block diagram for implementing plug-and-play in the serial communication bus system according to the present invention.

Please refer to FIG. 2, which illustrates a block diagram of the hardware architecture for implementing plug-and-play in the serial communication bus system according to the present invention. As shown in FIG. 2, even when multiple devices with the same device address D are connected simultaneously, the present invention can enable independent communication with individual slave devices 2 through the allocation of SIDs. As depicted in FIG. 2, slave devices 21, 22, 23, and 24, all with the same device address D, are connected to bus 3. The master device 1 assigns SID1, SID2, SID3, SID4, etc., to slave devices 21, 22, 23, and 24 respectively. The success of the assignment is confirmed when the master device 1 sequentially sends SIDs, and receiving the corresponding acknowledgment signal ACK means that the SID assignment was successful.

Figure 3:
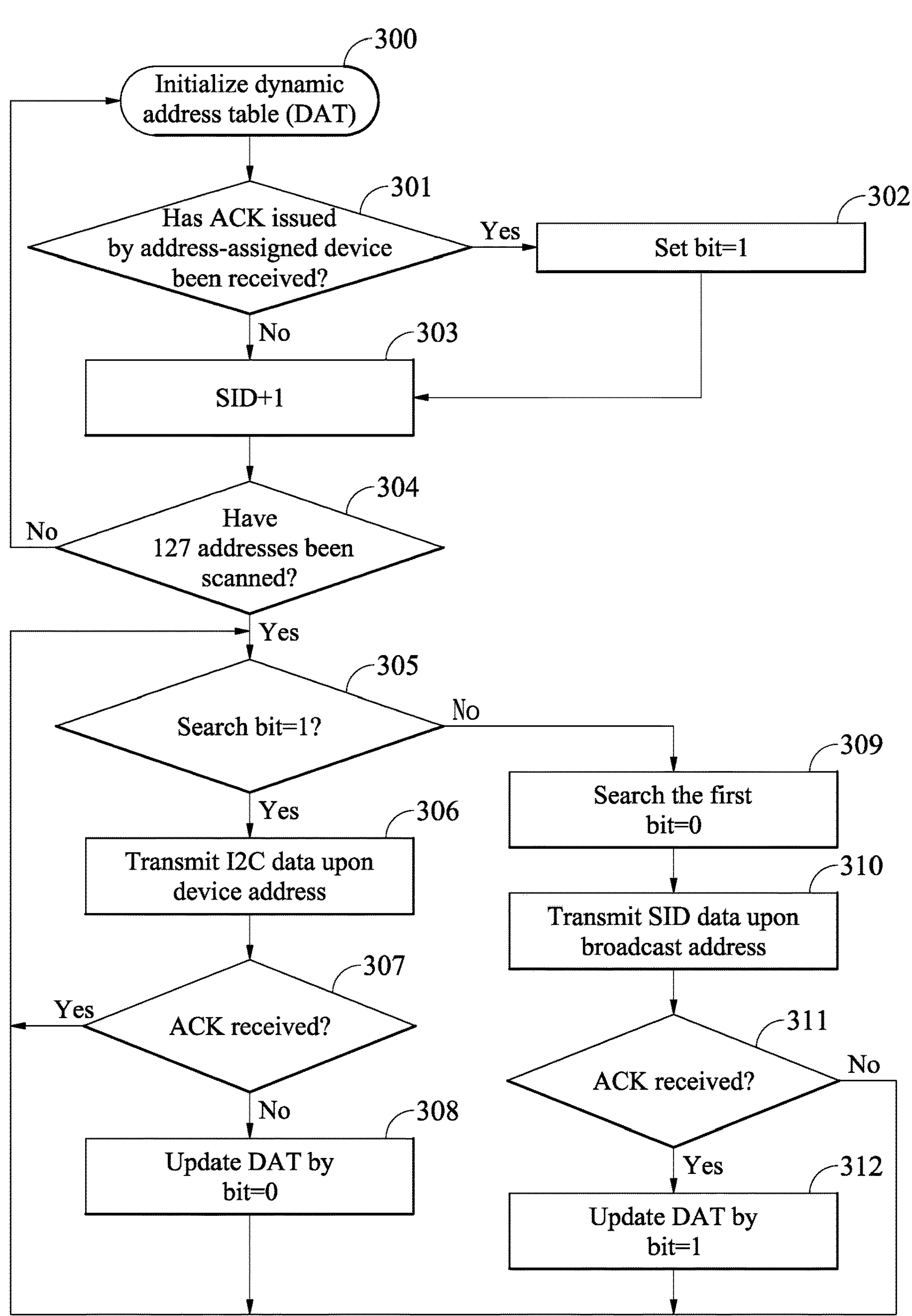
FIG. 3 presents a control flowchart of a preferred embodiment of the control method for the serial communication bus system according to the present invention.

Please refer to FIG. 3, which shows a control flowchart of a preferred embodiment of the control method for the serial communication bus system according to the present invention. Binary codes have two logical states: the first logic state and the second logic state. In the examples described below, the first logic state is represented by logic 1, or level high, and the second logic state is represented by logic 0, or level low. However, this is only for illustrative purposes and not intended to limit the invention. As shown in FIG. 3, the process begins with step 300, where the dynamic address table is initialized, and all bit values in the dynamic address table are cleared and set to 0. At this point, the slave devices 2 have not been assigned device addresses and cannot communicate with the master device 1. Therefore, when all the slave devices 2 power up, they all agree to communicate with the common initial address. If a slave device 2 remains powered up continuously, it will continue to use the assigned SID as its device address for communication. On the other hand, when the master device 1 powers up, it avoids the common initial address and scans each address to check if there are powered-up slave devices. If there are, the corresponding bit in the dynamic address table is set to 1. The initialization process is completed when all the addresses have been scanned.

In this example, since the serial communication bus is based on the I2C bus, the dynamic address table contains bits from 0 to 127. The process then proceeds to step 301, where the bus is scanned in a polling manner through the I2C bus to determine whether acknowledgment signals ACK are received from slave devices 2 that have been assigned device addresses (referred to as "connected" slave devices). If not, step 303 is performed, where the assigned SID is incremented, and the corresponding bit in the dynamic address table is incremented as well. This is followed by step 303. If it is determined in step 301 that acknowledgment signals ACK have been received, the process proceeds to step 302, where the dynamic address table is updated, and the bit corresponding to the address is set to 1. Then, the process continues to step 303, where the SID is incremented, and it checks whether all 127 addresses have been scanned thoroughly. If the scan is not completed, the process returns to steps 300-303 and repeats them until the dynamic address table with 128 bits is fully established.

Continuing with FIG. 3, the process proceeds to step 305, where it checks whether any bit in the dynamic address table has a value of 1. If the current bit value in the dynamic address table is 1, the process moves to step 306, where the master device 1 sends a Write Command to the slave device 2 corresponding to the bit that is currently 1 in the dynamic address table. It sends I2C data to that slave device 2 based on the assigned SID. In step 307, it checks whether an acknowledgment signal ACK is received from the corresponding slave device 2. If yes, it returns to step 305 to continue searching for the next bit in the dynamic address table with a value of 1. If not, the process proceeds to step 308, where the corresponding bit in the dynamic address table is set updated and set to 0, and then it returns to step 305 to continue searching for the next bit with a value of 1 in the dynamic address table.

In FIG. 3, if it is determined in step 305 that there are no bits with a value of 1 in the dynamic address table, the process moves to step 309, where it searches for the first bit with a value of 0 in the dynamic address table. Then, in step 310, it assigns an SID and broadcasts it along with the initial address. This broadcasts the SID address to the new connected device. In step 311, it checks whether an acknowledgment signal ACK is received. If yes, it means that the slave device 2 is a newly connected device, and the process proceeds to step 312, where the corresponding bit in the dynamic address table is updated and set to 1, and then it returns to step 305 to continue searching for the next bit with a value of 1 in the dynamic address table. If no acknowledgment signal ACK is received, the process returns to step 305 directly. Steps 309-312 are used to explain how different SIDs are assigned to individual slave devices 2 in the case of address conflicts shown in FIG. 2.

Figure 4:
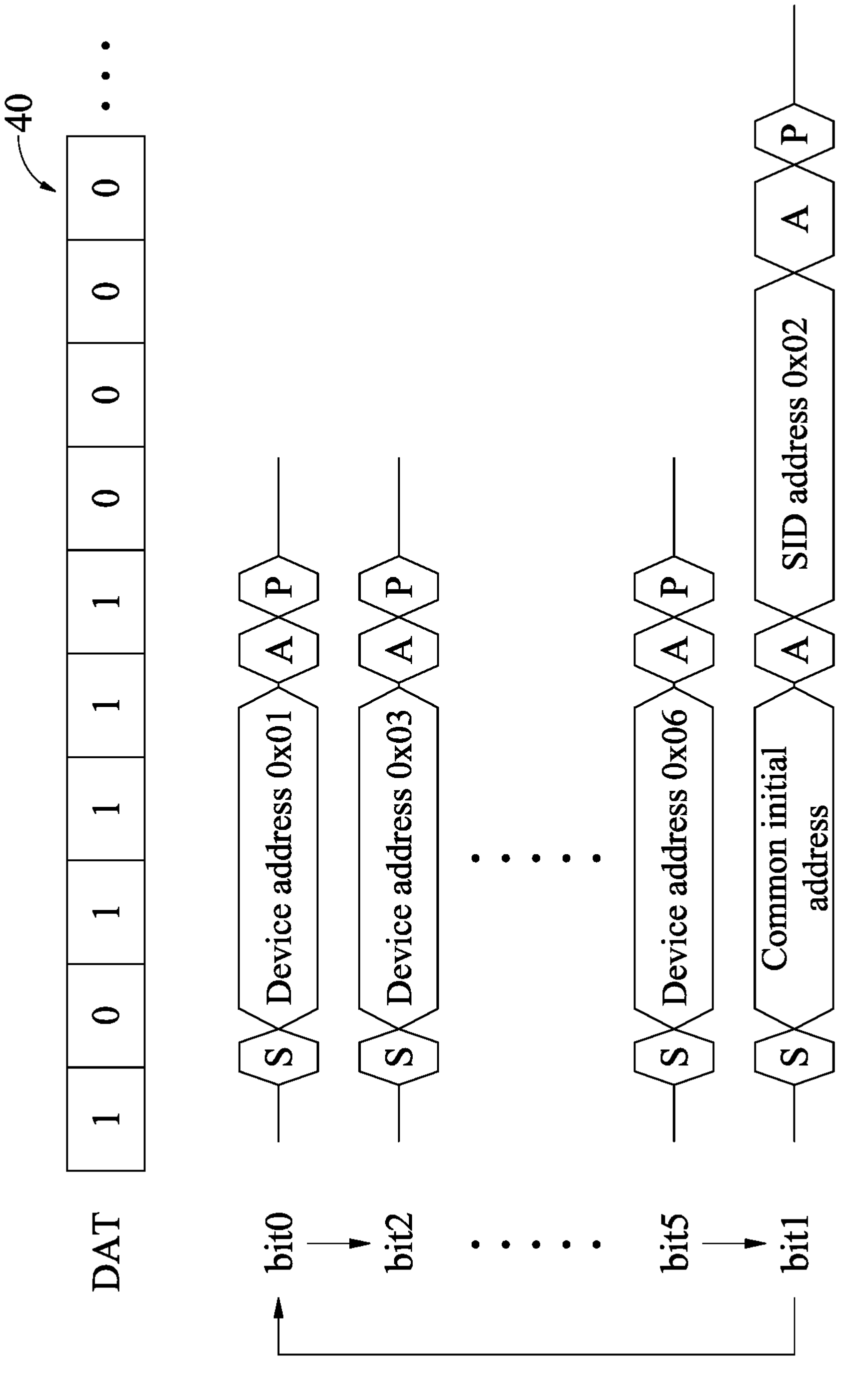
FIG. 4 is the schematic timing diagram of an actual example based on the embodiments of FIGS. 2 and 3.

Referring to FIG. 4, this shows the schematic timing diagram of an actual example based on the embodiments of FIGS. 2 and 3. However, this is for explanatory purposes only and is not intended to limit the scope of the patent application. As shown in FIG. 4, based on the established dynamic address table 40, the I2C master device 1 sequentially checks the positions where the bit values are 1. For these bits with values of 1, it sends out the corresponding device addresses on the I2C bus SDA line. In the example shown in FIG. 4, the bit values of bit0, bit2, bit3, bit4, and bit5 are all 1. Therefore, the master device 1 will sequentially send out the device addresses corresponding to these bits, such as Device Address 0x01, Device Address 0x03, Device Address 0x04, Device Address 0x05, and Device Address 0x06 on the I2C bus SDA line. It then waits for acknowledgment signals (ACK) from the corresponding slave devices 2 for these device addresses to confirm that these slave devices are in a connected state. If any slave device 2 fails to respond with an ACK acknowledgment signal, it indicates that the respective slave device 2 has been removed, and the master device 1 updates the corresponding bit value in the dynamic address table 40 to 0.

Next, after checking all the bits with a value of 1, it only needs to check the first bit with a value of 0. In the example shown in FIG. 4, this is bit1, with a bit value of 0. At this point, the master device 1 sends out the common initial address on the SDA line of the I2C bus 3, allowing a new slave device to connect. It then sends the corresponding SID=0x02 for bit1. This efficiently detects the real-time connection status of the slave devices 2, whether they are being connected or removed.

Since FIG. 4 is for illustrative purposes, and the I2C bus is a serial communication bus, the timing diagram shown in FIG. 4 does not represent the same time but only illustrates the device addresses or SIDs sent sequentially on the bus.

Therefore, the serial communication bus system and its control method disclosed by the present invention, with a dynamic address table, allows the master device to detect whether slave devices have been removed from the serial communication bus and can directly detect and assign new addresses to newly connected slave devices without conflicts with the addresses of already connected slave devices, thus overcoming the drawback of having to reassign addresses to all slave devices when implementing plug-and-play functionality.

It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A serial communication bus system with an address table comprising:

a master device;

multiple slave devices using a common initial address, where each of said slave devices can be one of a connected device and a newly connected device; and a serial communication bus, serving as a connection interface between said master device and said slave devices;

wherein said address table is initialized to contain multiple bits, each bit corresponding to a device address of one of said multiple slave devices, having a first logic state or a second logic state;

wherein said master device is configured for performing the steps of:

a polling through all available device addresses, and setting corresponding bit to said first logic state upon receiving an ACK message from a corresponding device address;

and repeatedly:

searching for bits with said first logic state in said address table;

looping through each one of said bits in said address table with said first logic state, and transmitting via said serial communication bus, data to a corresponding device address associated with said each one of said bits with said first logic state, and updating a corresponding bit of said each one of said bits to a second logic state if no ACK message is received from said corresponding device address; and obtaining a first bit in said address table with said second logic state if no bits with said first logic state were found in said address table, transmitting an assigned device address corresponding to said first bit along with said common initial address using a broadcast address, and updating said first bit to said first logic state upon receiving an ACK message from a newly connected device.

2. The serial communication bus system with an address table as claimed in claim 1, wherein said serial communication bus is an I2C Inter-Integrated Circuit (I2C) bus.

3. The serial communication bus system with an address table as claimed in claim 2, wherein said address table contains the common initial address.

4. The serial communication bus system with an address table as claimed in claim 3, wherein said common initial address is a General Call address.

5. The serial communication bus system with a dynamic an address table as claimed in claim 2, wherein said address table has 128 bits.

6. The serial communication bus system with an address table as claimed in claim 1, wherein said first logic state is logic 1 (on), and said second logic state is logic 0 (off).

7. The serial communication bus system with an address table as claimed in claim 1, wherein a confirmation of slave device connection and corresponding address assignment is achieved through said acknowledgment (ACK) signal.

8. A control method for a serial communication bus system with an address table, said serial communication bus system comprising a master device, multiple slave devices using a common initial address, and a serial communication bus connecting said master device and said slave devices, and said master device having said address table, said control method comprising the following steps:

(a) initializing said address table, said address table having multiple bits, each bit corresponding to one particular device address, polling through all available device addresses, and setting a corresponding bit to a first logic state upon receiving an ACK message from a corresponding device address;

(b) searching for bits with said first logic state in said address table;

(b1) looping through each one of said bits in said address table with said first logic state, and transmitting, by said master device via said serial communication bus, data to a corresponding device address associated with each one of said bits with said first logic state, and updating a corresponding bit of said each one of said bits to a second logic state if no ACK message is received from said corresponding device address;

(c) obtaining a first bit in said address table with said second logic state if no bits with said first logic state were found in said address table, and transmitting an assigned device address corresponding to said first bit along with said common initial address using a broadcast address, and updating said first bit to said first logic state upon receiving an ACK message from a newly connected device; and (d) returning to step (b).

9. The control method as claimed in claim 8, wherein said serial communication bus is an I2C Inter-Integrated Circuit (I2C) bus.

10. The control method as claimed in claim 9, wherein said address table contains the common initial address.

11. The control method as claimed in claim 10, wherein said common initial address is a General Call address.

12. The control method as claimed in claim 9, wherein said address table has 128 bits.

13. The control method as claimed in claim 8, wherein said first logic state is logic 1 (on), and said second logic state is logic 0 (off).

14. The control method as claimed in claim 8, wherein a confirmation of slave device connection and corresponding address assignment in steps (b1) and (c) is achieved through said acknowledgment (ACK) signal.

* * * * *